E. PODLESAK.
CURRENT GENERATOR AND IGNITER FOR INTERNAL COMBUSTION ENGINES.
APPLICATION FILED DEC. 23, 1914.
Reissued Feb. 9, 1915.
13,878.
2 SHEETS—SHEET 1.
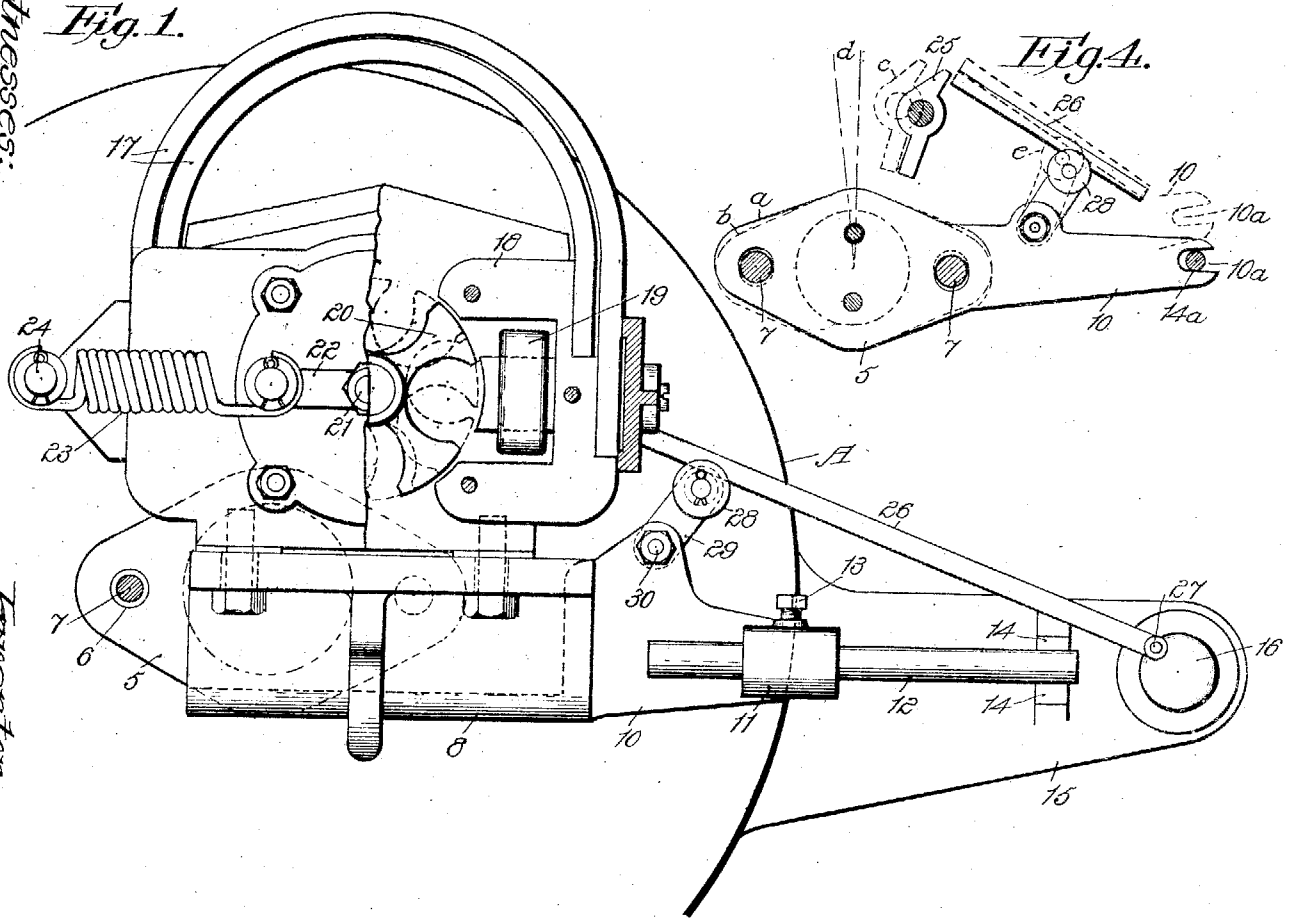
Witnesses:
Albin C. Ahlberg
Robert F. Brack
Inventor
Emil Podlesak
By Lynn A. Williams
Attorney E. PODLESAK.
CURRENT GENERATOR AND IGNITER FOR INTERNAL COMBUSTION ENGINES.
APPLICATION FILED DEC. 23, 1914.
Reissued Feb. 9, 1915.
13,878.
2 SHEETS—SHEET 2.
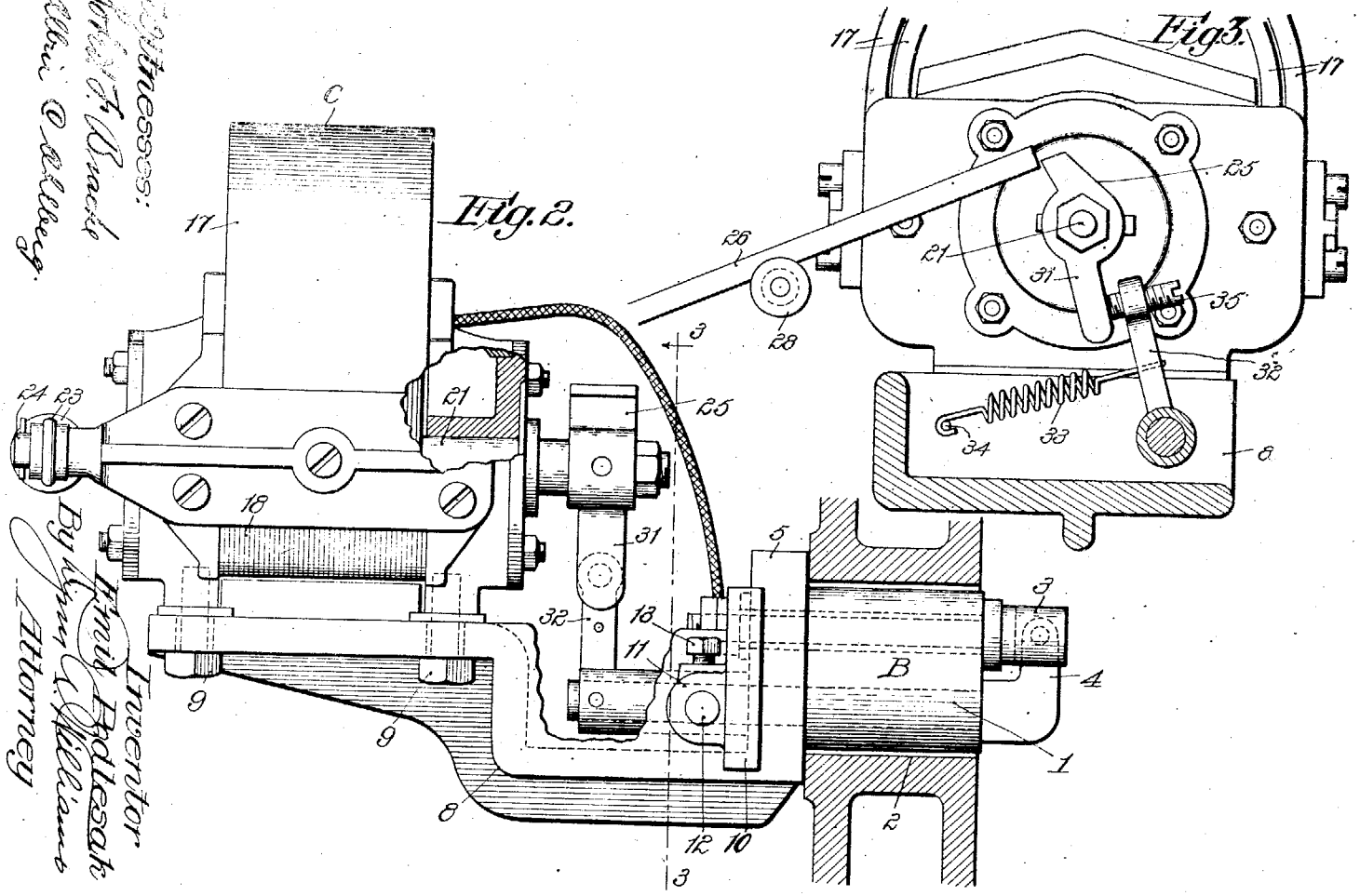
Witnesses:
Robert F. Brache
Albin O. Ahlberg.
Inventor
Emil Podlesak
By Lynn S. Williams
Attorney

UNITED STATES PATENT OFFICE.

EMIL PODLESAK, OF TIFFIN, OHIO.

CURRENT-GENERATOR AND IGNITER FOR INTERNAL-COMBUSTION ENGINES.

13,878. Specification of Reissued Letters Patent. Reissued Feb. 9, 1915.

Original No. 1,055,076, dated March 4, 1913, Serial No. 690,931. Application for reissue filed December 23, 1914. Serial No. 878,726.

*To all whom it may concern:*

Be it known that I, EMIL PODLESAK, a citizen of the United States, residing at Tiffin, in the county of Seneca and State of Ohio, have invented certain new and useful Improvements in Current-Generators and Igniters for Internal-Combustion Engines, of which the following is a specification.

This invention relates to igniters of the make and break type and in which the magneto or current generator is combined therewith as a unitary structure that is fastened to the head or other suitable part of the engine cylinder, the rotor of the generator being operatively connected with the movable electrode of the igniter so that a reciprocatory actuator, push rod or equivalent means operating on the rotor trip finger against the tension of spring means causes the rotor to move to "cocked" position while the electrodes of the igniter are brought together, and then released from such "cocked" position so that the electromotive force generated by the sudden return movement of the rotor through the magnetic field of the generator will produce the igniting current whereby the spark is produced between the electrodes in the compression chamber of the engine. The combination of means and instrumentalities above referred to is the subject-matter of my pending application for Letters Patent of the United States, Serial No. 668,153, filed December 27, 1911, and the present invention relates to improvements especially adapted for combined igniters and generators of the type referred to.

The actuating means for the rotor and movable electrode is mounted on the engine cylinder or other suitable part and is operatively connected with some moving mechanism and has no connection with the magneto or igniter, since the actuator, which may be a push rod, rotating or oscillatory arm or the like, merely contacts with the trip finger of the rotor. As the igniter and generator must be removed from time to time for cleaning the electrodes and other reasons, it is of great importance that the igniter and generator be replaced in exactly the same position it was before removal: otherwise, the push rod will not be disposed in proper relation to the trip finger of the rotor to accomplish satisfactory results in the operation of the engine, generator and igniter. The reason for this liability of the igniter being replaced in a different position from that which it originally occupied when all the operating parts, were adjusted to accomplish the best results, is due to the fact that the holes in the body of the igniter for receiving the bolts or fastening studs are made larger than the bolts or studs, as is also the opening in the engine cylinder for receiving the body of the igniter, this "latitude" between the parts being provided so as to facilitate easy removal of the igniter and to obviate the necessity of careful and expensive machining and fitting of the parts. By reason of the liability to error in replacing the igniter, there is provided an arm or equivalent means on the igniter body to inter-engage with a fixed part on the engine cylinder, so that there can be but one position in which the igniter can be attached to the cylinder, and that position is the one where the push rod or other actuator is in proper relation to the trip finger of the rotor. As the result of this arrangement, it is never necessary to adjust the relation of the various instrumentalities in replacing the igniter when it has been removed for cleaning or any other purpose.

In addition to the foregoing objects and advantages, the invention has certain other minor advantages which will appear hereinafter as the description proceeds in reference to the accompanying drawings, in which—

Figure 1 is a front view of the combined igniter and current generator applied to the head of an engine cylinder, part of the generator being shown in section. Fig. 2 is a front view thereof showing a portion of the cylinder head in section. Fig. 3 is a sectional view on line 3—3, Fig. 2. Fig. 4 is a diagrammatic view to show the results of a defective positioning of the igniter with respect to the operating push rod.

Similar reference characters are employed to designate corresponding parts throughout the views.

Referring to the drawings, A designates the head or other wall of a cylinder of an internal combustion engine; B, the make and break igniter; and C, the magneto current generator of the inductor type.

The igniter B comprises a cylindrical body 1 which passes through an opening 2 in the cylinder head A, the opening being of slightly larger diameter than the diameter of the igniter body, so that the latter can be easily inserted or removed. Passing through the igniter body is a fixed electrode 3 with which coöperates a movable or rocking electrode 4. The outer end of the igniter body is formed with a rhomboidal plate 5, which, as shown in Fig. 1, has bolt-receiving openings 6 that are slightly larger in diameter than the fastening bolts or studs 7 that pass through the openings and are fastened to the cylinder head A. Thus, there is considerable latitude allowed between the body of the igniter on the one hand and the cylinder head and fastening bolts on the other, and by reason of this, the igniter body is liable to be fastened to the cylinder head in a variety of positions within the limit of this latitude, the disadvantages of which have been hereinbefore pointed out, but are overcome by the improvements later to be set forth.

Extending from the plate portion 5 of the igniter body is a shelf or bracket 8 which forms a base to which the generator C is removably secured by stud bolts 9. Projecting laterally from the bracket or shelf 8 is an arm 10 which is formed at its outer extremity with a boss or enlargement 11 that has a passage through which extends an extension rod 12, the rod being fastened in any desired position by a set screw 13 or equivalent means. The outer extremity of this extension rod is located at a considerable distance from the axis of the igniter and this extremity is adapted to engage some fixed part of the engine, such for instance as lugs 14 on the arm 15 in which the operating shaft 16 rotates. The lugs 14 are spaced apart far enough for the extension rod to enter between them as the igniter body is inserted in the opening in the engine cylinder, and when thus positioned, it is impossible for the igniter body to shift angularly or around its axis and thereby disturb the proper relation of the igniter and generator operating means. The parts 10, 12 and 14 thus constitute means for insuring the proper positioning of the igniter and the design of the parts is such that no special care or adjustment is required in taking off or replacing the igniter.

The generator C is fully set forth in the pending application hereinbefore referred to, so that only a brief description here is deemed necessary. The generator comprises permanent horseshoe magnets 17 fastened to E-shaped pole pieces 18, on the middle projections of which are generating coils 19. In the present drawings, only one pole piece and coil is shown in Fig. 1, the other corresponding parts being concealed from view. Between the pole pieces oscillates a cruciform rotor 20 mounted on a shaft 21 which has at one end oppositely disposed crank arms 22 which are connected with springs 23 that assume an alining position through the axis of the rotor when the latter is idle, the outer ends of the springs being fastened to studs 24 on the generator frame. On the opposite end of the rotor shaft is a trip finger 25 which is adapted to have a wiping engagement with a push rod 26 or other equivalent actuator, which rod has its end opposite from the trip finger connected with the crank pin 27 of the rotating shaft 16. The push rod or actuator has a combined reciprocatory and rocking movement on a bearing pulley 28 journaled on a support 29 which is fastened by a bolt or equivalent means 30 to the arm 10 of the igniter frame, said bolt forming a pivot on which the member 29 can be adjusted to different positions for bringing the free end of the push rod 26 into proper coöperative relation with the trip finger 25. The trip finger has a tail piece or arm 31 which is adapted to be engaged by an arm 32 fastened to the outer end of the movable electrode 4, the arm 32 being held yieldingly against the arm 31 by a helical extension spring 33 which has one end connected with the arm 32 and the other end anchored at 34 on the igniter frame. To obtain the proper set of the sparking points of the electrodes with respect to the rotor of the generator, one arm, such as 32, has an adjustable screw 35 which engages the arm 31. The spring 33 is of less tension than the return springs 23 of the rotor and is sufficient to maintain the arms 31 and 32 in contact during the first part of the cocking movement of the armature and to maintain the electrodes in contact during the final part of such cocking movement, it being understood that the electrodes are normally separated, and that they come into contact before the rotor or armature finishes its cocking movement, or the position of the rotor shown by dotted lines in Fig. 1. At the end of the cocking movement, the push rod 26 slips off the tip of the trip finger, and the springs 23, which have been extended or placed under tension during the cocking movement, quickly snap the rotor back to and beyond its normal position, as indicated by the dot and dash lines, Fig. 1. This quick movement of the rotor quickly changes the path of the magnetic flux through the pole pieces and rotor, with the result that a high electro-motive force is induced in the generating coils, the maximum electro-motive force occurring at about the time the electrodes are separated during the return movement of the arm 31 of the trip finger, such arm being adapted to strike the arm 32 a hammer blow for effecting a quick separation of electrodes.

By referring to Fig. 4 the effect of a defective positioning of the igniter is clearly depicted. Without the use of the positioning controlling parts 10, 12 and 14, it is possible for the igniter to be secured in either the full line position *a* or dotted line position *b*, because of the latitude provided between the igniter body and the bolts and cylinder wall. In other words, the igniter can be fastened to one side or the other of its true central position to an extent corresponding to the angle *d*. Thus, the trip arm of the rotor 25 would be in the dotted line position *c* when the igniter is in the dotted line position *b*, and as a consequence the push rod 26 would not be long enough to operate the trip finger 25, and furthermore the push rod supporting roller 28 would be raised to the dotted line position *e*, thereby raising the active end of the trip rod above the tip of the trip finger. When the igniter body is in the full line position *a*, the trip finger is shifted to the right and the supporting roller 28 is lowered so that the push rod and trip finger will obviously be in proper position. These contingencies can be guarded against by providing the arm 10 on the igniter body and having some means on the fixed part of the engine to engage such arm, such means being the lugs 14, as in Fig. 1, or a bolt or pin $14^a$ engaging in the slot $10^a$ of the arm 10, as in Fig. 4.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. The combination of an engine cylinder, a make and break igniter, fastening means for securing the igniter in position on the cylinder, an electric generator having its movable element operatively connected with the movable element of the igniter, an actuator for the movable elements of the igniter and generator, said igniter being removable from the cylinder while the actuator remains in place, and means in addition to the said fastening means for insuring the correct positioning of the igniter with respect to the actuator when the former is replaced on the engine after removal and for preventing shifting of the igniter, said latter means comprising engaged parts on the engine cylinder and igniter.

2. The combination of an engine cylinder, an igniter, means for removably fastening the igniter on the cylinder, there being sufficient play between the parts to insure removal of the igniter while rendering the igniter liable to replacement for different positions, an actuator for the igniter requiring a predetermined position of the igniter with respect thereto, and means partly on the igniter and partly on the engine for insuring such predetermined relative position of the actuator and igniter.

3. The combination of an engine cylinder, an igniter and electric generator forming a unitary structure removably mounted on the cylinder, fastening means for the said unitary structure, said structure being liable to replacement in different positions on the cylinder, an actuator for the movable elements of the generator and igniter and operatively connected with the moving part of the engine, and means in addition to the said fastening means for insuring a predetermined relative position of the actuator and movable elements of the igniter and generator, said latter means consisting of relatively fixed parts of the said structure and engine cylinder which inter-engage when the said structure is in proper position.

4. The combination of an engine cylinder having an opening, an igniter disposed in the opening and liable to be fastened in different positions therein, an actuator for the movable electrode of the igniter, and means for insuring the proper positioning of the igniter with respect to the actuator, said means comprising a laterally-extending arm on the igniter, and a fixed part on the engine with which the arm is adapted to engage.

5. The combination of an engine cylinder having an opening, an igniter disposed in the opening and liable to be fastened in different positions therein, an actuator for the movable electrode of the igniter, and means for insuring the proper positioning of the igniter with respect to the actuator, said means comprising an arm on the igniter, a longitudinally adjustable member on the arm, and a part fixed on the engine with which the said member is adapted to releasably engage.

6. The combination of an engine cylinder, a make and break igniter mounted thereon and liable to assume different positions within certain limits, an actuator for the movable element of the igniter, means for moving the actuator, a laterally-extending arm on the igniter, and means fixed on the engine with which the arm is removably connected to insure such position of the igniter that the actuator and movable electrode will be in proper relation to each other, and means on the arm for supporting the actuator.

7. The combination of an engine cylinder, a make and break igniter removably mounted thereon and liable to assume different positions within certain limits, a generator carried by the igniter and removable therewith as a unitary structure, the movable elements of the igniter and generator being operatively connected, an actuator for the said movable elements, a moving part of the engine with which the actuator remains connected while the igniter and generator are removed, and engaging means between the said structure and engine cylinder for permitting the placing of the latter in only one position.

8. The combination of an engine cylinder having an opening, a make and break igniter secured in the opening and liable to assume different positions within certain limits, a generator mounted on the igniter and removable therewith, means for operatively connecting the movable elements of the igniter and generator, a push rod, a trip finger connected with one of the movable elements and with which the actuator is adapted to engage, and means arranged partly on the engine and partly on the igniter and generator structure whereby the push rod and trip finger will be in proper relation to each other each time the igniter and generator structure is replaced after removal from the cylinder.

9. The combination of an engine cylinder, an igniter mounted thereon, a generator mounted on the igniter, means for operatively connecting the movable elements of the generator and igniter to move together, a trip finger connected with the said movable elements, an operating shaft, a push rod adapted to engage the trip finger, means for reciprocating the rod by the shaft, and means whereby the igniter and generator structure can be fastened in only one position where the push rod and trip finger are in proper relation to each other, said means comprising a part on the igniter and generator structure and a part on the engine with which the first part is detachably engaged.

10. The combination of an engine, an igniter mounted on the cylinder thereof, a bracket extending from the igniter, a generator on the bracket, means for operatively connecting the movable elements of the generator and igniter together, a trip finger connected with the movable elements, a push rod adapted to wipe on the trip finger, means for actuating the push rod, an arm extending from the bracket, a support on the arm for the trip rod, and means fixed on the engine with which the arm engages whereby the igniter can be replaced on the engine cylinder in only that position in which the trip finger and push rod are in proper relation.

11. The combination of an engine cylinder, an arm extending laterally from the head thereof, a shaft bearing in the arm, a push rod, and a crank pin connection between the shaft and push rod, with an igniter mounted on the engine cylinder and having its movable electrode operatively related to the push rod, an arm extending from the igniter, and means on the arm of the engine cylinder with which the first-mentioned arm detachably engages for permitting the igniter to be attached in only that position where the push rod and movable electrode are in proper relation, and means on the first-mentioned arm for movably supporting the push rod.

12. The combination of an engine cylinder, an igniter and current generator structure removably mounted thereon, the movable elements of the igniter and generator being operatively connected, a trip finger connected with such movable elements, an arm extending from the igniter, means fixed with respect to the engine cylinder for engagement with the arm whereby the said structure can be fastened in only one position on the cylinder, an actuating push rod arranged to engage the trip finger, means for reciprocating the push rod, and an adjustable support mounted on the arm and on which the push rod moves.

13. The combination of an igniter having relatively fixed and movable electrodes, an arm on the movable electrode, a generator having a rotor, an arm connected therewith, spring means tending to hold the rotor in a given position, spring means of less tension than the first-mentioned means and operating on the first-mentioned arm to hold the same in engagement with the second-mentioned arm, and a trip device for actuating the rotor.

14. The combination of an igniter having relatively fixed and movable electrodes, an arm on the movable electrode, a generator having a rotor, an arm connected therewith, spring means tending to hold the rotor in a given position, spring means of less tension than the first-mentioned means and operating on the first-mentioned arm to hold the same in engagement with the second-mentioned arm, a trip device for actuating the rotor, and means on one of said arms for adjusting the relation of the arms and thereby the relation of the position of the movable electrode to the rotor.

15. The combination of an igniter having relatively fixed and movable electrodes, an arm on the movable electrode, a generator having a rotor, an arm on the rotor, a trip finger on the rotor, a push rod for operating the trip finger, a spring tending to hold the arm of the electrode into engagement with the arm of the rotor, and spring means operatively connected with the rotor for holding the same in a predetermined position.

16. The combination of an igniter frame, comprising a body, a supporting base, and an arm extending laterally therefrom, with an internal combustion motor, sparking electrodes mounted in said body, a magneto generator mounted on said base, means for actuating the said generator to generate current, means for actuating one of the electrodes, and means relatively fixed on said motor for engaging said laterally extending arm.

17. The combination of an igniter frame, comprising a body, a supporting base, and an arm extending laterally therefrom, with an internal combustion engine, sparking electrodes mounted in said body and adapted to make and break a circuit within the combustion chamber of the engine, a magneto generator mounted on said base, means for actuating the magneto generator to generate current, means for operating one of the lectrodes coöperatively with said generator, a member extensibly mounted in said laterally extending arm, and means secured in relatively fixed relation on the engine to engage said extensible member.

18. In combination, a magneto generator comprising a field magnet, a pair of pole pieces, inductive windings, and a rotor mounted on a shaft, means for cocking said rotor, spring means for suddenly bringing said rotor back upon the release, an igniter frame comprising a body and a shelf extending therefrom and supporting said generator, a stationary insulated electrode and a movable electrode mounted in said body, said movable electrode adapted to make contact with the other said electrode, an arm on said rotor shaft and adapted to coöperate with said arm on movable electrode to so oscillate the movable electrode as to make and break contact with said other electrode, a circuit connecting said windings to said electrodes, and an arm extending from said igniter frame and adapted to engage on a relatively fixed member on the engine associated with said frame.

19. The combination of an igniter having relatively fixed and movable electrodes, an arm on the movable electrode, a generator having a rotor, an arm connected therewith, spring means tending to hold the rotor in a given position, spring means of less tension than the first-mentioned means operating on the first-mentioned arm to hold the same in engagement with the second-mentioned arm, an integral bracket upon and in which all of the aforesaid mechanism is mounted, and a trip device for actuating the rotor.

20. The combination of an igniter having relatively fixed and movable electrodes, an arm on the movable electrode, a generator having a rotor, an arm connected therewith, spring means tending to hold the rotor in a given position, spring means of less tension than the first-mentioned means operating on the first-mentioned arm to hold the same in engagement with the second-mentioned arm, means on one of said arms for adjusting the relation of the arms and therefore the relation of the position of the movable electrode in the rotor, a unitary bracket comprising a body in which the relatively fixed and movable electrodes are mounted and a shelf extending laterally therefrom and integral therewith upon which the said generator is mounted, and a trip device for actuating the rotor.

21. The combination of an igniter having relatively fixed and movable electrodes, an arm on the movable electrode, a generator having a rotor, an arm on the rotor, a trip finger on the rotor, a push rod for operating the trip finger, a spring tending to hold the arm of the electrode into engagement with the arm of the rotor, spring means operatively connected with the rotor for holding the same in a predetermined position, and an integral bracket having a body in which the said electrodes are mounted and a shelf laterally extending therefrom and upon which the said generator is mounted.

22. The combination of an igniter frame, comprising a body having relatively fixed and movable electrodes mounted therein, a supporting shelf or base extending laterally therefrom and integral therewith; an electric current generator comprising field magnet and a rotor, mounted on said base; spring means for holding the rotor in a predetermined position; an arm on the rotor; an arm on said movable electrode adapted to engage with the first-mentioned arm; spring means for bringing said two arms into engagement; and a trip finger on the rotor.

23. The combination of an igniter frame comprising a body having relatively fixed and movable electrodes mounted therein, a supporting base extending laterally therefrom and integral therewith, with an internal combustion motor, a magneto generator mounted on said base and having a rotor, spring means tending to hold the rotor in a predetermined position, an arm on the rotor, an arm on said movable electrode adapted to engage with the first-mentioned arm, spring means for bringing the first-mentioned arm into engagement with the second mentioned arm, a trip finger on the rotor, and means operable by said motor for actuating the trip finger.

24. The combination of an igniter frame, comprising a body and a laterally extending base, with an internal combustion motor, a magneto generator having a rotor and mounted on said base, spring means tending to hold the rotor in a predetermined position, a trip finger on the rotor, a reciprocatory push rod driven by the motor for actuating the trip finger, a fixed electrode and a movable electrode mounted in the body and adapted to make and break contact with each other within the combustion chamber of the motor, an arm on the rotor, an arm on the movable electrode adapted to engage with the arm of the rotor, spring means for bringing the arm of the movable electrode into engagement with the arm of the rotor, and means on one of said arms for adjusting the relation of the arms and thereby the relation of the position of the movable electrode to the rotor.

In witness whereof, I hereunto subscribe my name this 30th day of October, A. D. 1914.

EMIL PODLESAK.

Witnesses:
B. R. Beckwith,
H. F. Geist.